United States Patent
Adams et al.

(10) Patent No.: US 6,457,030 B1
(45) Date of Patent: Sep. 24, 2002

(54) SYSTEMS, METHODS AND COMPUTER PROGRAM PRODUCTS FOR MODIFYING WEB CONTENT FOR DISPLAY VIA PERVASIVE COMPUTING DEVICES

(75) Inventors: Samuel S. Adams, Apex, NC (US); Stefan G. Hild, Zurich (CH); Richard O. LaMaire, Yorktown Heights, NY (US); Hiroshi Maruyama, Tokyo (JP); Rakesh Mohan, Stamford, CT (US); Sandeep Singhal, Raleigh, NC (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,137

(22) Filed: Jan. 29, 1999

(51) Int. Cl.[7] ............................................... G06F 17/21
(52) U.S. Cl. ...................... 707/523; 707/522; 707/513
(58) Field of Search ............................. 707/523, 501.1, 707/513, 522; 345/738, 781, 760; 709/217–219

(56) References Cited

U.S. PATENT DOCUMENTS

| | | | | |
|---|---|---|---|---|
| 5,737,599 A | | 4/1998 | Rowe et al. ................. | 395/615 |
| 5,890,172 A | * | 3/1999 | Borman et al. ............. | 345/781 |
| 5,983,247 A | * | 11/1999 | Yamanaka et al. .......... | 707/513 |
| 6,029,182 A | * | 2/2000 | Nehab et al. ............ | 707/501.1 |
| 6,161,114 A | * | 12/2000 | King et al. ................. | 707/517 |
| 6,226,642 B1 | * | 5/2001 | Beranek et al. ............. | 345/738 |
| 6,249,794 B1 | * | 6/2001 | Raman ....................... | 707/500 |

FOREIGN PATENT DOCUMENTS

EP 0813159 A2 6/1997

OTHER PUBLICATIONS

Morris, John. Data Structures and Algorithms: Hash Tables. 1998. pp. 1–4.*
Spyglass Prism: Concepts and Applications. 1997. pp. 1–8.*
Chang et al., Adaptation to network link bandwidth fluctuation in WWW, Jour. Chinese Inst. Engs., vol. 21, No. 1, pp. 59–72 (Jan. 1998).

* cited by examiner

*Primary Examiner*—Joseph H. Feild
(74) *Attorney, Agent, or Firm*—Myers Bigel Sibley & Sajovec; A. Bruce Clay

(57) ABSTRACT

Systems, methods and computer program products are provided for modifying Web content files, such as HTML files, for display via pervasive computing devices that have smaller displays and various performance limitations compared with desktop computing devices. Upon receiving a request from a pervasive computing device for an HTML file, the HTML file is analyzed for a link to a content modification file that contains information about how to modify elements within the HTML file so as to render the HTML file displayable via the pervasive computing device.

42 Claims, 6 Drawing Sheets

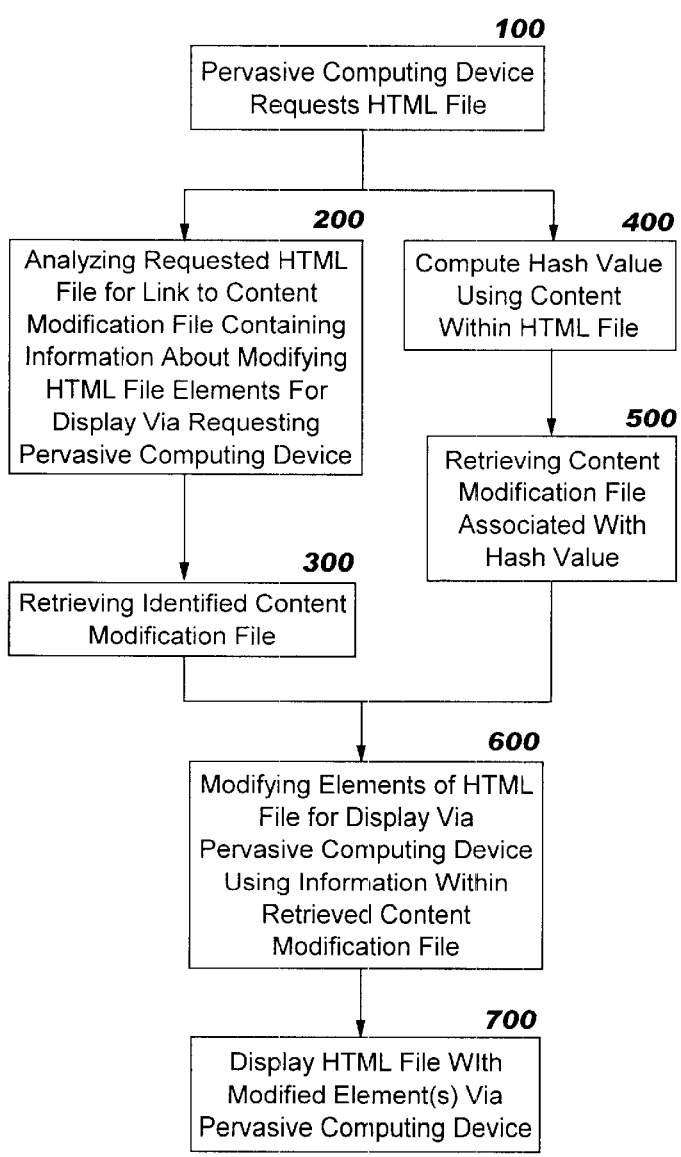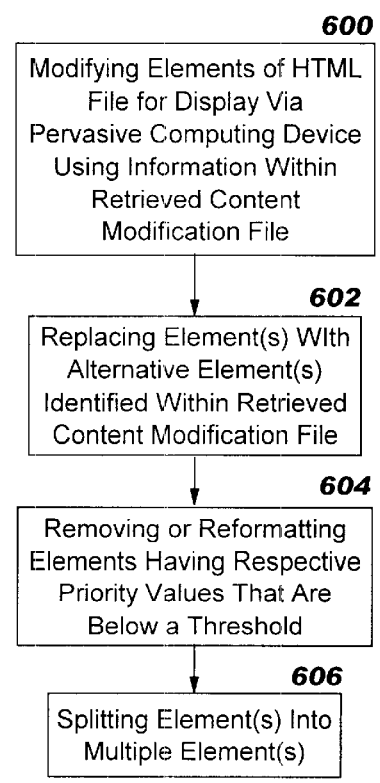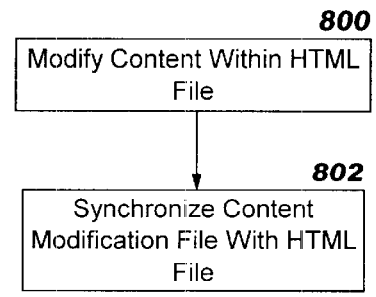

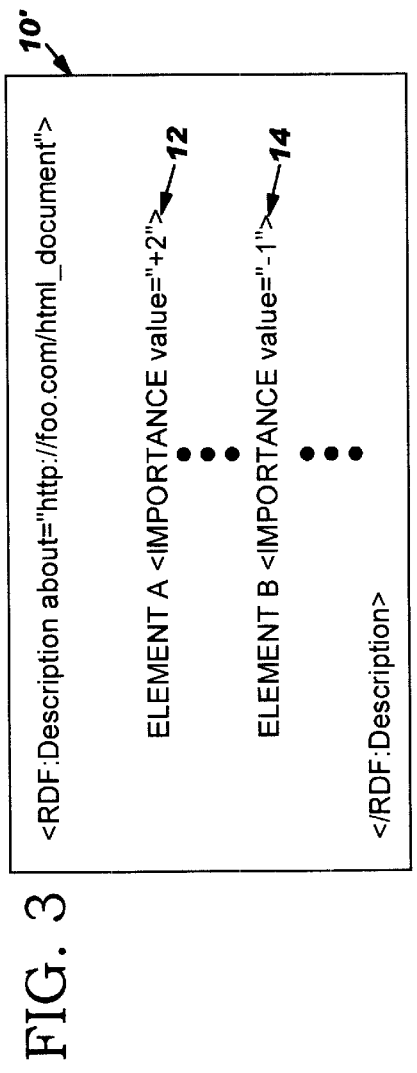

FIG. 4C

```
<ALTERNATIVES>
<CLIENT SCREEN-WIDTH="640" SCREEN-HEIGHT="480" FIDELITY="1.0" SCREEN-COLOR="256" SCREEN-MONOCHROME="FALSE"> — 20a
BANDWIDTH="28.8kbs">prog1s2j1.jpg</CLIENT>
<CLIENT SCREEN-WIDTH="320" SCREEN-HEIGHT="240" FIDELITY="0.6" SCREEN-COLOR="16" SCREEN-MONOCHROME="FALSE"> — 20b
BANDWIDTH="14.4kbs">prog1s2j2.jpg</CLIENT>
<CLIENT SCREEN-WIDTH="160" SCREEN-HEIGHT="140" FIDELITY="0.3" SCREEN-COLOR="4" SCREEN-MONOCHROME="TRUE"> — 20c
BANDWIDTH="9.6kbs">prog1s2j3.jpg</CLIENT>
</ALTERNATIVES>
```

FIG. 5A

```
http://----

<HTML>
<META>
<link href="http://foo.com/catalog.meta">
</META>
<BODY>
<H2>Porsche A-1</H2>          //Important text//          — 34a
<P>xxxxx</P>                                              — 30
<IMG src="car1.jpg">           //Important Image//        — 34b
<P>yyyyy</P>                   //Less important text//
<H2>Mercedes 999</H2>          //Logical separation point; can start new page here//  — 36a
<P>xxxxx</P>                   //Important text//         — 32
<IMG src="car2.jpg">           //Important Image//        — 36b
<P>yyyyy</P>                   //Less important text//

...

</BODY>
</HTML>
```

```
<?xml version="1.0"?>
<!xml:namespace name="http://www.w3.org/TR/WD-rdf-syntax#"   as="RDF"?>
<!xml:namespace name="http://www.ibm.com/HTMLplusplus#"     as="PLUS"?>
<!xml:namespace name="http://purl.org/metadata/dublin_core#" as="DC"?>
<RDF:RDF>
    <RDF:Description about="http://foo.com/catalog.html">  ← 42
        <DC:title>Car Catalog</DC:title>
        <DC:author>Hiroshi Maruuama</DC:author>
    </RDF:Description>

<RDF:Description about="http://foo.com/catalog.html#root().child(2)">   //Porsche A-1  ← 41a
    <PLUS:importance value="+2"/>
    <RDF:Alt>
        <RDF:LI>
            <IMAGE WIDTH="160" HEIGHT="120" FIDELITY="1" COLOR="256" MONO="FALSE" BYTES="21072">prog1s1j1.jpg</IMAGE>   ← 44a
        </RDF:LI>
        <RDF:LI>
            <IMAGE WIDTH="120" HEIGHT="90" FIDELITY="0.6" COLOR="16" MONO="FALSE" BYTES="4345">prog1s1j1c16.gif</IMAGE>   ← 44b
        </RDF:LI>
        <RDF:LI>
            <IMAGE WIDTH="120" HEIGHT="90" FIDELITY="0.3" COLOR="4" MONO="TRUE" BYTES="1809">prog1s1j1m4.gif</IMAGE>   ← 44c
        </RDF:LI>
    </RDF:Alt>
</RDF:Description>
<RDF:Description about="http://foo.com/catalog.html#root().child(1,H2),child(2,P)">   ← 48
    <PLUS:importance value="-1"/>
</RDF:Description>
<RDF:Description about="http://foo.com/catalog.html#root().child(1,H2),child(2,H2)">   ← 52
    <PLUS:pagebreak priority="3"/>
</RDF:Description>
</RDF:Description>
```

SYSTEMS, METHODS AND COMPUTER PROGRAM PRODUCTS FOR MODIFYING WEB CONTENT FOR DISPLAY VIA PERVASIVE COMPUTING DEVICES

FIELD OF THE INVENTION

The present invention relates generally to computer files and, more particularly, to the display of computer files.

BACKGROUND OF THE INVENTION

The Internet is a worldwide decentralized network of computers having the ability to communicate with each other. The Internet has gained broad recognition as a viable medium for communicating and interacting across multiple networks. The World-Wide Web (Web) was created in the early 1990's and is comprised of server-hosting computers (Web servers) connected to the Internet that have Web content files (referred to as Web pages) stored therewithin. Web pages are accessible by client programs (i.e., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), and Gopher and content formats including plain text, Extensible Markup Language (XML), as well as image formats such as Graphics Interchange Format (GIF) and Joint Photographic Experts Group (JPEG).

A Web site is conventionally a collection of Web pages and files related to a particular subject that includes a beginning file called a home page. A large Web site may reside on a number of geographically-dispersed Web servers. The Web site of the International Business Machines Corporation (www.ibm.com), for example, consists of thousands of Web pages and files spread out over various Web servers in locations world-wide.

As is known to those skilled in this art, a Web page is conventionally formatted via a standard page description language such as HyperText Markup Language (HTML), which typically contains text and can reference graphics, sound, animation, and video data. HTML provides for basic document formatting and allows a Web content provider to specify anchors or hypertext links (typically manifested as highlighted text) to other Web servers and files. When a user selects a particular hypertext link, a Web browser reads and interprets an address, called a Uniform Resource Locator (URL) associated with the link, connects the Web browser with a Web server at that address, and makes an HTTP request for the file identified in the link. The Web server then sends the requested file to the Web client which the Web browser interprets and displays to the user.

An intranet is a private computer network conventionally contained within an enterprise and that conventionally includes one or more servers in communication with multiple user computers. An intranet may be comprised of interlinked local area networks and may also use leased lines in a wide area network. An intranet may or may not include connections to the outside Internet. Intranets conventionally utilize various Internet protocols and, in general, often look like private versions of the Internet. An intranet user conventionally accesses an intranet server via a Web browser running locally on his/her computer.

Exemplary Web browsers for both Internet and intranet use include Netscape Navigator® (Netscape Communications Corporation, Mountain view, Calif.) and Internet Explorer® (Microsoft Corporation, Redmond, Wash.). Web browsers typically provide a graphical user interface for retrieving and viewing information, applications, and other resources hosted by Internet/intranet servers (hereinafter collectively referred to as "Web servers").

Web content on the Internet and intranets includes, but is not limited to, text, images, applications, applets, and other video and audio resources (collectively referred to herein as "elements"). Web content is conventionally delivered from a Web server to a Web browser on a user's computer in the form of Web pages.

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize cellular telephones to access the Internet and to perform various other computing functions. Computing devices including, but not limited to, PDAs, cellular telephones, and computing devices utilized within appliances and automobiles, are often collectively referred to as "pervasive" computing devices. Many hand-held computing devices utilize the Microsoft® Windows CE and 3Com Palm Computing® platforms.

Unfortunately, pervasive computing devices may have displays that are small in size compared with desktop computer displays. As a result, portions of Web content, such as images and text that are otherwise displayable on a desktop computer display, may not be displayable on a pervasive computing device display unless some modifications to the images and/or text are made. For example, a desktop computer display having an array of 1024 pixels by 1280 pixels may be able to display a large (e.g., 2 megabit), 32 bit per pixel color image. A hand-held computing device with a display having an array of 160 pixels by 120 pixels and with the ability to display only about 3 bits per pixel, may have to ignore much of the image data. As a result the image may not be displayed properly, if at all, via the pervasive computing device display unless he size of the image is reduced. Text font and size ay also need to be changed to permit the display thereof within a pervasive computing device display. Performance limitations of pervasive computing devices, such as memory size and connection bandwidth, may also require changes to Web content for proper display via a pervasive computing device.

Files that may not be displayable via a pervasive computing device display can typically be transformed into a format that is displayable within a hand-held computing device display. For example, large, high resolution, color images can be transformed into small, black and white images that can be displayed within small, low resolution displays. Web content modification, such as image and text modification, is referred to as "transcoding." The modification of Web content structure, such as the structure of an HTML file, is referred to as "transformation."

Because some Web servers can recognize the type of client device requesting a file, files in the proper format for display via the requesting client device can be provided. Unfortunately, an enormous number of Web content files can reside within a Web site on both the Internet and on intranets. Furthermore, an enormous number of files are typically added every day to various Web sites. Because of the tremendous number of files available at Web sites, it may be somewhat impractical to create, store, and maintain duplicate Web content files that are displayable via selected computing devices. Accordingly, it would be desirable to be able to transcode and transform Web content upon demand so that Web content is displayable via any pervasive computing device.

Annotations could be made to each HTML file that specify how portions of the HTML file are to be transcoded and/or transformed so as to be displayable via a pervasive computing device. Such annotations could take the form of tags and/or attributes that could be included within an HTML file. Unfortunately, such tags and/or attributes could require the addition and acceptance thereof to the current HTML standard (i.e., HTML 4.0). Extending the syntax of the current HTML standard to incorporate new tags and/or attributes may be a difficult and time consuming task. Furthermore, even if it is possible to incorporate new tags and/or attributes within the current HTML standard, existing Web browsers may not be capable of handling these new tags and attributes.

SUMMARY OF THE INVENTION

In view of the above discussion, it is an object of the present invention to facilitate the display of Web content via pervasive computing devices that may have smaller displays and various performance limitations as compared with desktop computing devices.

It is another object of the present invention to facilitate the modification of Web content without requiring modification to existing HTML standards.

It is yet another object of the present invention to facilitate on-demand Web content modification into a form suitable for presentation on pervasive computing devices.

These and other objects of the present invention are provided by systems, methods and computer program products for modifying a Web content file, such as an HTML file, for display via a pervasive computing device, wherein the file contains an element having a characteristic that can hinder display of the file via the pervasive computing device. The term "display" is intended to encompass all methods of presentation of Web content, whether visual, audio, or a combination thereof. Upon receiving a request from a pervasive computing device, the requested HTML file is analyzed for a link to a content modification file that contains information about how to modify elements within the HTML file so as to be displayable via the pervasive computing device.

The content modification file is then retrieved. Once retrieved, elements within the HTML file are modified using the information contained within the retrieved content modification file so as to be displayable via the requesting pervasive computing device. For example, selected elements may be replaced with alternative elements that are configured for display via the pervasive computing device. Elements having a lower priority than other elements may be reformatted or excluded altogether. Furthermore, elements may be divided into multiple elements. For example, text elements may be divided into separate sections each of which are entirely displayable within the display of a pervasive computing device.

The present invention can be advantageous because the need to maintain duplicate Web content files that are configured for display within specific types of pervasive computing devices may be eliminated. The present invention can allow a Web content file, such as an HTML file, to be modified on-demand for immediate display within virtually any type of computing device that requests the Web content file. Furthermore, the present invention can enable existing Web content to be transcoded and transformed so as to be displayable within any pervasive computing device upon request, and without requiring modifications to existing HTML standards.

The present invention is not limited to transcoding and transforming content for display via pervasive computing devices. Other implementations of the present invention may include accurately translating HTML files into multiple languages, and transcoding and transforming Web content based on a user's preferences. For example, if a user is blind, text elements could be transcoded into audio files.

BRIEF DESCRIPTION OF THE DRAWINGS

FIG. 1A schematically illustrates operations according to the present invention for modifying a Web content file, such as an HTML file, for display via a pervasive computing device.

FIG. 1B schematically illustrates various operations for modifying selected elements of an HTML file for display via a pervasive computing device.

FIG. 1C schematically illustrates operations for synchronizing an HTML file and a corresponding content modification file according to an embodiment of the present invention.

FIG. 3 illustrates a portion of an exemplary content modification file that is linked with an HTML file, according to an embodiment of the present invention.

FIGS. 4A–4C illustrate various embodiments of the present invention wherein elements within an HTML file are replaced with alternative elements.

FIGS. 5A–5B illustrate the modification of an exemplary HTML file (catalog.html) via various aspects of the present invention.

DETAILED DESCRIPTION OF THE INVENTION

Figure 2:
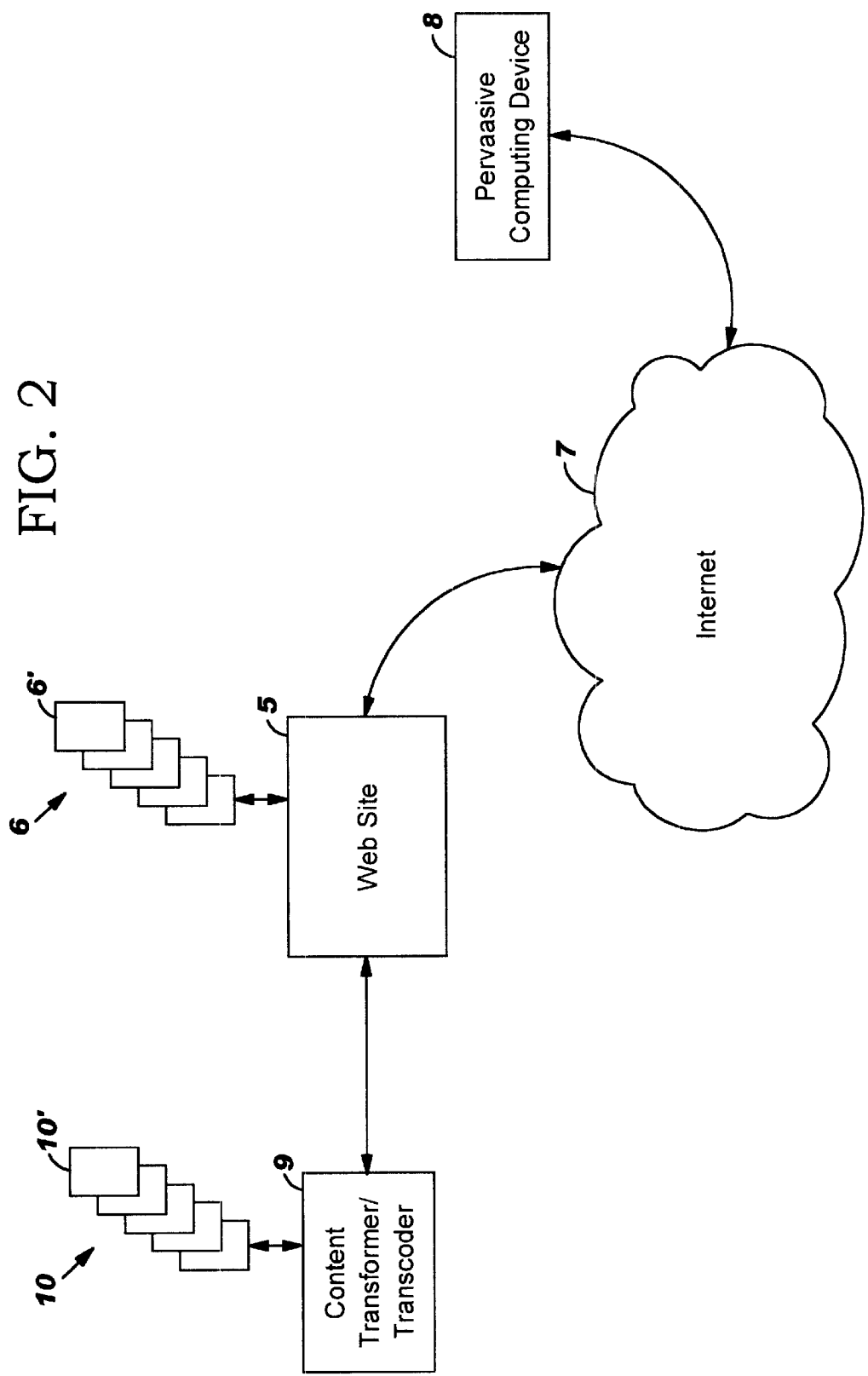
FIG. 2 schematically illustrates a system for carrying out the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object-oriented programming language such as JAVA®, Smalltalk, or C++. However, the computer program code for carrying out operations of the present invention may also be written in conventional procedural programming languages, such as the "C" programming language, or in a functional (or fourth generation) programming language such as Lisp, SML, or Forth. The program code may execute entirely on a Web server, or it may execute partly on a Web server and partly on a remote computer (i.e., a user's Web client or a Web proxy). In the latter scenario, the remote computer may be connected to the Web server through a LAN or a WAN, or the connection may be made through the Internet (e.g., via an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring now to FIG. 1A, operations according to the present invention for modifying a Web content file (such as an HTML file) for display via a pervasive computing device are illustrated. It is to be understood that the present invention is not limited to the modification of HTML files. Web content files having any format that is displayable or performable via a computing device can be modified in accordance with the present invention. For example, any Web content file conforming to or derived from the Standard Generalized Markup Language (SGML) standard such as HTML and eXtensible Markup Language (XML), may be modified in accordance with the present invention. The term "modifying" is intended to include content transcoding and/or content transforming as described above. The term "display" is intended to encompass all methods of presentation of Web content, whether visual, audio, or a combination thereof.

When an HTML file is requested by a pervasive computing device (Block 100), the HTML file is analyzed to identify a link to a content modification file (also referred to as a "meta file") that contains information about modifying elements within the HTML file so as to be displayable within the pervasive computing device (Block 200). The term "element" includes all parts of an HTML file, including, but not limited to text, graphics, audio files, video files, applets, applications, and references to sound, animation, and video data. Using the aforementioned link, the identified content modification file can then be retrieved (Block 300).

An alternative method of locating a content modification file is to compute a hash value using content within the HTML file (Block 400). Hash values and the calculation thereof are well known to those skilled in the art and need not be described further herein. A content modification file associated with the computed hash value can then be retrieved from a repository (e.g., a database) of content modification files (Block 500). This hash-based approach is appropriate when the content provider does not wish to modify the HTML pages at all (e.g., even for purposes of adding the link to the content modification file), when the content being modified is in a format that does not lend itself to supporting a file link (e.g., a plain text file), or when content modification is managed and performed by an administrative entity (e.g., in a proxy, content aggregator, or other service provider) other than the original content author/provider.

According to the present invention, a content modification file is capable of referencing one or more elements of an HTML file. The pointer might be to a single element, such as an image file, or to a range of elements. A particularly preferred pointer is the XPointer methodology. For example, "root( ).child(3).child(7)" points to the seventh child element of the third child element of the root element of an HTML file. If the target element has an identification attribute associated with it, the identification attribute can be used instead of a long expression path. XPointer methodology is understood by those skilled in this art and need not be described further herein.

Information within a retrieved content modification file is then used to modify selected elements of the HTML file for display via the requesting pervasive computing device (Block 600). As illustrated in FIG. 1B, modifying selected elements of an HTML file for display via a pervasive computing device may include various operations that may depend on either the type of elements or the type of pervasive computing device requesting the HTML file. According to one aspect, selected elements may be replaced with alternative elements identified within the retrieved content modification file (Block 602). For example, alternative image files that are smaller in size may be utilized in lieu of larger image files. A block of text having a different font and/or style and/or length may be substituted for a block of text within a requested HTML file.

According to another aspect of the present invention, elements of an HTML file having priority values associated therewith that are beneath a predetermined threshold may be removed or reformatted, leaving only essential elements for display within a pervasive computing device or capable of being transmitted over the network bandwidth available to the pervasive computing device (Block 604). For example, non-essential images and text, based on priority information included within the retrieved meta file, may be removed from an HTML file prior to being delivered for display by the pervasive computing device. According to another aspect of the present invention, an element may be divided into multiple elements based upon logical structure information provided within a retrieved content modification file (Block 606). For example, text may be divided into separate, displayable units (or pages) each of which is displayable within the display of a pervasive computing device.

A single content modification file may be linked by a single HTML file or may be linked by multiple HTML files. For example, all the content modification information for an application, consisting of a set of HTML files and image files, could be encoded within a single content modification file. This can be useful if HTML files are generated as a unit by an authoring tool such as NetObject Fusion by NetObjects Inc., Redwood City, Calif.

Alternatively, multiple content modification files may be linked to a single HTML file. This approach may be useful when elements of an HTML file appear in many different HTML files.

The present invention also includes a mechanism for maintaining synchronization between an HTML file and a corresponding content modification file. As illustrated schematically in FIG. 1C, in response to the modification of content within an HTML file (Block 800), a content modification file associated with the HTML file is also modified (Block 802). Any synchronization method could be utilized, as would be understood by those skilled in the art. For example, synchronization could be implemented via a database that has a general purpose metacontent capability.

Another implementation may utilize a digest value or hash value such as Message Digest 5 (MD5) for ensuring that the HTML file has not been changed. For example, if an MD5 value of an entire HTML file is recorded in a content modification file, a system can check if a given content modification file is an up-to-date version appropriate for use with the subject HTML file. As is known by those skilled in this art, hashing is the transformation of a string of characters into a usually shorter fixed-length value or key that represents the original string. A well known hashing function is the MD5 hashing function. MD5 was authored by Ronald L. Rivest, Massachusetts Institute of Technology, Laboratory for Computer Science, Cambridge, Mass., and is described in the Network Working Group Request for Comments 1321 (RFC 1321), Information Sciences Institute, University of Southern California, Marina del Rey, Calif., April, 1992, which is incorporated herein by reference in its entirety.

Referring now to FIG. 2, a system for carrying out aspects of the present invention is schematically illustrated. A Web site 5 containing HTML files 6 is connected to a computer network 7, such as the Internet. A pervasive computing device 8 is configured to communicate with, and receive HTML files 6 from, the Web site 5 via the Internet 7. A data processing system 9 for transforming and/or transcoding content within requested HTML files (hereinafter referred to as the transcoder/transformer), according to the present invention, is in communication with the Web site 5 as illustrated. The transcoder/transformer logic receives Web content from the Web site and applies modifications to convert that content into a form that is appropriate for delivery over the network coupled to the pervasive device and for display on the pervasive device. In the preferred embodiment, the transcoder/transformer logic executes within a proxy server which receives requests from the pervasive device using HTTP, WSP (Wireless Session Protocol, a protocol defined by the Wireless Application Protocol (WAP) Forum, etc.) and retrieves content from the Web site using standard HTTP protocols. It is understood that the transcoder/transformer 9 could be configured to communicate with the Web site 5 via the Internet 7 or via another computer network. In alternative embodiments of this invention, the transcoder/transformer logic may execute within the Web server that hosts the Web site, in which case it may be implemented as a Common Gateway Interface (CGI) application, a Java servlet, or logic contained within an Active Server Page; mechanisms for implementing this Web server-side logic are well understood by those skilled in the art and will not be discussed further herein. Alternatively, the transcoder/transformer may execute within the pervasive device itself by intercepting retrieved Web content before it is processed by the device's Web browser.

The transcoder/transformer 9 provides means for analyzing a request for an HTML file 6' from a pervasive computing device and for retrieving a content modification file 10' associated with the requested HTML file from a repository of content modification files 10. The transcoder/transformer 9 modifies elements within the requested HTML file 6' based upon information contained within the content modification file 10'.

Content Priority

Referring now to FIG. 3, a portion of an exemplary content modification file 10' that is linked with an HTML file (html_document) is illustrated. The illustrated content modification file 10' contains "<IMPORTANCE>" tags 12 and 14 that relate to, and indicate priorities of, elements A and B, respectively. Elements A and B may represent various elements of an HTML file, including, but not limited to, images, text, video files, audio files, and the like. In the illustrated content modification file 10', element A has a higher priority relative to element B and, thus, has been assigned a priority value of +2. Element B has a lower priority relative to element A and, therefore, has been assigned a priority value of −1. It is understood that although the preferred embodiment uses the "IMPORTANCE" tag to define the priority of HTML document elements, alternative embodiments may describe this priority information using different tag names while preserving the salient features of this invention.

Accordingly, when a pervasive computing device requests an HTML file linked to the illustrated content modification file 10', the transcoder/transformer (9, FIG. 2) can make a decision whether and/or how to display elements A and B based upon the assigned priorities (Block 604, FIG. 1B). For example, because of its low priority, element B may be reformatted or ignored altogether when the pervasive device has limited display characteristics or when the pervasive device network has limited bandwidth.

Alternative Content

Referring to FIGS. 4A–4C, various aspects of replacing elements within an HTML file with alternative elements (Block 302, FIG. 1B), according to the present invention, are illustrated. Alternative elements according to the present invention may have different physical parameters (values) such as "HEIGHT", "WIDTH" "COLOR", and "BYTES" that describe the display characteristics of an alternative element. In addition, alternative elements according to the present invention may include various user-assigned parameters that indicate other characteristics. For example, the "FIDELITY" tag may provide an evaluation of how detailed is the information content provided by that alternative content representation. For example, a summarized paragraph would have a lower value of FIDELITY than the original (full-length) paragraph. Similarly, a wireframe sketch has lower FIDELITY than an original full-color photograph.

In FIG. 4A, content-specific alternative video files 16a, 16b, 16c can be selected to replace a video file contained within an HTML file requested by a pervasive computing device. Each of the illustrated alternative video files 16a, 16b, 16c has different parameters. For example, video file 16c is smaller (in bytes) than video files 16a and 16b, has a lower stream rate than video files 16a and 16b, and has lower fidelity than video files 16a and 16b. Video file 16b is smaller than video file 16a, but larger than video file 16c. Video file 16a is the largest of the three alternative video files 16a, 16b, 16c, and has the highest fidelity.

In FIG. 4B, content-specific alternative image files 18a, 18b, 18c can be selected to replace an image file contained within an HTML file requested by a pervasive computing device. Each of the illustrated alternative image files 18a, 18b, 18c has different parameters. For example, image file 18c has fewer colors than image files 18a and 18b. Image file 18c also is the same size as image file 18b, but smaller than image file 18a. Image file 18a is the largest of the three alternative image files 18a, 18b, 18c, and has the most colors.

Referring now to FIG. 4C, client-specific alternative image files 20a, 20b, 20c are illustrated. These image files (20a, 20b, 20c) are client-specific because each is designed for display via a specific type of pervasive computing device requesting an HTML file. For example, image file 20a is configured for display via a client with a screen width of 640 pixels, a screen height of 480 pixels, and a color depth of 256 colors. Image files 20b, 20c are configured for display via clients with smaller displays. Image file 20b is configured for display via a client with a screen width of 320 pixels, a screen height of 240 pixels, and a color depth of 16 colors. Image file 20c is configured for display via a client with a screen width of 160 pixels, a screen height of 140 pixels, and a color depth of 4 colors.

It is understood that alternative elements according to the present invention are not limited to the illustrated content-specific and client specific parameters. Other parameters may be utilized and various combinations of client-specific and content-specific parameters may be utilized, as well.

EXAMPLE

Figure 5B:
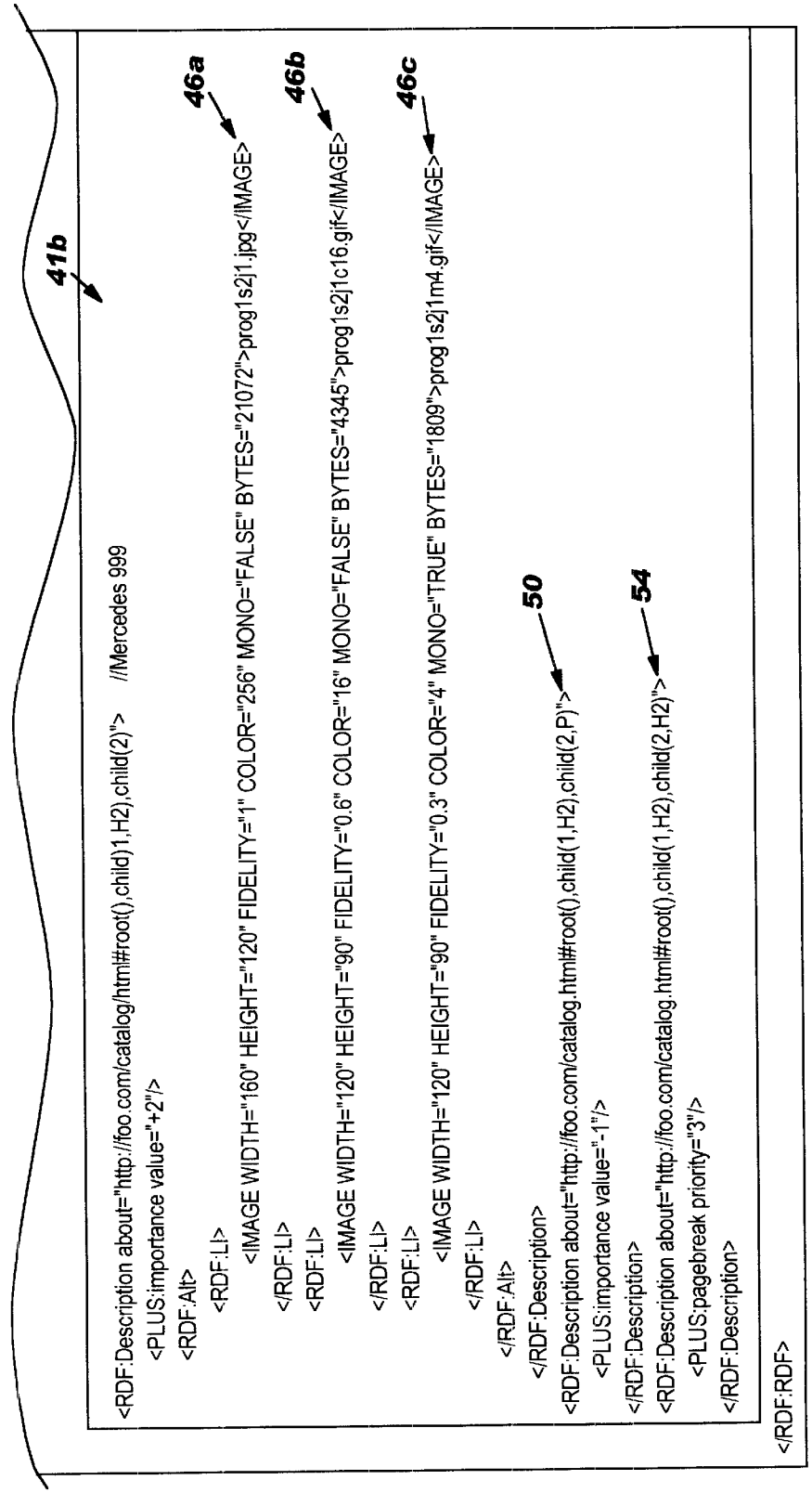

Referring now to FIGS. 5A and 5B, modification of an exemplary HTML file 6' (catalog.html) using various aspects of the present invention is illustrated. The illustrated HTML file 6' has a URL of http://foo.com/catalog.html. The illustrated HTML file 6' in FIG. 5A is a portion of a car catalog that, when displayed via a browser, displays images 30, 32 of several cars including related text portions 34a, 34b and 36a, 36b, respectively. As would be understood by those skilled in this art, the illustrated HTML file 6' is in HTML source code which is interpreted and displayed by a browser. In the illustrated HTML file 6', "xxxxx" (34a) represents text within a paragraph (indicated by tags "<P>" and "</P>") preceding the image "car1.jpg" (30). In the illustrated HTML file 6', "yyyyy" (36b) represents text within another paragraph following the image "car2.jpg" (32).

With respect to the illustrated HTML file 6', it is desired that each car image 30, 32 be displayed via a pervasive computing device requesting the HTML file 6'. Each car image 30, 32 is large in size and should be replaced with respective alternative images having a smaller size when displayed within a pervasive computing device.

The text portions 34a, 34b and 36a, 36b associated with each respective image 30, 32 have different priorities. Text portions 34a, 36a are considered important and should be displayed with each image 30, 32, respectively. Text portions 34b, 36b are considered as having lesser importance and may be omitted when the HTML file 6' is displayed via a pervasive computing device.

In order to modify the HTML file 6' of FIG. 5A for display via a pervasive computing device as described above, a content modification file 40 (catalog.meta) is retrieved as illustrated in FIG. 5B. The illustrated content modification file 40 has a URL of http://foo.com/catalog.meta, and is linked with the HTML file 6' of FIG. 5A via a link 42. The illustrated content modification file 40 contains two sections: a Porsche A-1 section 41a, and a Mercedes 999 section 41b. Section 41a relates to the portion of the HTML file 6' containing image 30 and text portions 34a, 34b. Section 41b relates to the portion of the HTML file 6' containing image 32 and text portions 36a, 36b.

Three alternative images 44a, 44b, 44c are available for replacing image 30 in the HTML file 6' of FIG. 5A. Image 44c is smaller in size than image 44b which is smaller in size than image 44a. Accordingly, a decision as to which image (44a, 44b or 44c) should be used to replace the image 30 of the HTML file 6' of FIG. 5A may be based upon the display capabilities of a pervasive computing device requesting the HTML file 6'.

Similarly, three alternative images 46a, 46b, 46c are available for replacing image 32 in the HTML file 6' of FIG. 5A. As described above, a decision as to which image (46a, 46b or 46c) should be used to replace the image 32 of the HTML file 6' of FIG. 5A may be based upon the display capabilities of a pervasive computing device requesting the HTML file 6'.

With respect to the text portion 34a of the HTML file 6' of FIG. 5A, which has a higher priority than text portion 34b, a priority assignment 48 is made as illustrated in FIG. 5B. Accordingly, only the text portion 34a will be displayed in conjunction with the Porsche section 41a when the HTML file 6' is requested by a pervasive computing device having limited screen size. Similarly, a priority assignment 50 is made as illustrated in FIG. 5B for the text portion 36a. As described above, text portion 36a has a higher priority than text portion 36b. Accordingly, only the text portion 36a will be displayed in conjunction with the Mercedes section 41b when the HTML file 6' is requested by a pervasive computing device having limited screen size.

A page break indication 52 and 54 is also provided for at the end of the Porsche and Mercedes sections 41a, 41b, respectively, as indicated in FIG. 5B. Accordingly, the HTML file 6' will be split into two pages (i.e., one page for section 41a, and one page for section 41b) when displayed via a pervasive computing device with a limited screen size requesting the HTML file 6'.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of modifying a Web content file for display via a pervasive computing g device, the method comprising the following steps:
    receiving a request from a pervasive computing device for the Web content file, wherein the Web content file contains an element having a characteristic that hinders display thereof via the pervasive computing device;
    analyzing the Web content file for a link to a content modification file associated with the requested Web content file;
    retrieving the content modification file, wherein the content modification file references the element in the Web content file, wherein the content modification file contains information about modifying the element so as to be displayable via the requesting pervasive computing device; and
    modifying the element using the information contained within the retrieved content modification file.

2. A method according to claim 1 further comprising the step of serving the requested Web content file with the modified element to the pervasive computing device for display thereon.

3. A method according to claim 1 wherein the Web content file is a HyperText Markup Language (HTML) file.

4. A method according to claim 1 wherein the step of retrieving a content modification file associated with the Web content file comprises the steps of:
    computing a hash value using content within the Web content file; and
    retrieving a content modification file associated with the computed hash value from a repository of content modification files.

5. A method according to claim 1 wherein the step of modifying the element comprises the step of replacing the element with an alternative element identified within the retrieved content modification file, wherein the alternative element is displayable via the pervasive computing device.

6. A method according to claim 1 wherein the step of modifying the element comprises the step of splitting the element into multiple elements.

7. A method according to claim 1 wherein the step of modifying the element comprises modifying the element to conform with identified characteristics of the pervasive computing device.

8. A method according to claim 1 wherein the Web content file comprises a plurality of elements, wherein each element has a respective priority value assigned thereto, and wherein the step of modifying an element comprises the step of removing elements that have respective priority values that are below a selected threshold value.

9. A method according to claim 1 wherein the Web content file comprises a plurality of elements, wherein each element has a respective priority value assigned thereto, and wherein the step of modifying an element comprises the step of modifying elements that have respective priority values that are below a selected threshold value.

10. A method according to claim 1 wherein the retrieved content modification file is an extensible Markup Language (XML) file.

11. A method of modifying a HyperText Markup Language (HTML) file for display via a pervasive computing device, wherein the HTML file contains a plurality of elements each having respective characteristics that can hinder display thereof via the pervasive computing device, the method comprising the following steps which are performed by a data processing system in communication with a Web server that receives a request from the pervasive computing device for the HTML file:
    analyzing the requested HTML file for a link to a content modification file, wherein the content modification file references the plurality of elements, and wherein the content modification file contains information about modifying the plurality of elements so as to render the elements displayable via the pervasive computing device;
    retrieving the identified content modification file; and
    replacing at least one element with an alternative element identified in the retrieved content modification file, wherein the alternative element is displayable via the pervasive computing device.

12. A method according to claim 11 wherein the plurality of elements have respective priority values assigned thereto, and further comprising the step of removing elements that have respective priority values that are below a selected threshold value.

13. A method according to claim 11 wherein the plurality of elements have respective priority values assigned thereto, and further comprising the step of modifying elements that have respective priority values that are below a selected threshold value.

14. A method according to claim 11 further comprising the step of splitting at least one of the elements into multiple elements.

15. A system for modifying a Web content file for display via a pervasive computing device, comprising:
    means for receiving a request from a pervasive computing device for the Web content file, wherein the Web content file contains an element having a characteristic that hinders display thereof via the pervasive computing device;
    means for analyzing the Web content file for a link to the content modification file;
    means for retrieving a content modification file associated with the requested Web content file, wherein the content modification file references the element in the Web content file, wherein the content modification file contains information about modifying the element so as to be displayable via the requesting pervasive computing device; and
    means for modifying the element using the information contained within the retrieved content modification file.

16. A system according to claim 15 further comprising means for serving the requested Web content file with the modified element to the pervasive computing device for display thereon.

17. A system according to claim 15 wherein the Web content file is a HyperText Markup Language (HTML) file.

18. A system according to claim 15 wherein the means for retrieving a content modification file associated with the Web content file comprises:
    means for computing a hash value using content within the Web content file; and
    means for retrieving a content modification file associated with the computed hash value from a repository of content modification files.

19. A system according to claim 15 wherein the means for modifying the element comprises means for replacing the element with an alternative element identified within the retrieved content modification file, wherein the alternative element is displayable via the pervasive computing device.

20. A system according to claim 15 wherein the means for modifying the element comprises means for splitting the element into multiple elements.

21. A system according to claim 15 wherein the means for modifying the element comprises means for modifying the element to conform with identified characteristics of the pervasive computing device.

22. A system according to claim 15 wherein the Web content file comprises a plurality of elements, wherein each element has a respective priority value assigned thereto, and wherein the means for modifying an element comprises means for removing elements that have respective priority values that are below a selected threshold value.

23. A system according to claim 15 wherein the Web content file comprises a plurality of elements, wherein each element has a respective priority value assigned thereto, and wherein the means for modifying an element comprises means for modifying elements that have respective priority values that are below a selected threshold value.

24. A system according to claim 15 wherein the retrieved content modification file is an extensible Markup Language (XML) file.

25. A system for modifying a HyperText Markup Language (HTML) file for display via a pervasive computing device, wherein the HTML file contains a plurality of elements each having respective characteristics that can hinder display thereof via the pervasive computing device, comprising:
   means for analyzing the requested HTML file for a link to a content modification file, wherein the content modification file references the plurality of elements, and wherein the content modification file contains information about modifying the plurality of elements so as to render the elements displayable via the pervasive computing device;
   means for retrieving the identified content modification file; and
   means for replacing at least one element with an alternative element identified in the retrieved content modification file, wherein the alternative element is displayable via the pervasive computing device.

26. A system according to claim 25 wherein the plurality of elements have respective priority values assigned thereto, and further comprising means for removing elements that have respective priority values that are below a selected threshold value.

27. A system according to claim 25 wherein the plurality of elements have respective priority values assigned thereto, and further comprising means for modifying elements that have respective priority values that are below a selected threshold value.

28. A system according to claim 25 further comprising means for splitting at least one of the elements into multiple elements.

29. A computer program product for modifying a Web content file for display via a pervasive computing device, the computer program product comprising a computer usable storage medium having computer readable program code means embodied in the medium, the computer readable program code means comprising:
   computer readable program code means for receiving a request from a pervasive computing device for the Web content file, wherein the Web content file contains an element having a characteristic that hinders display thereof via the pervasive computing device;
   means for analyzing the Web content file for a link to the content modification file;
   computer readable program code means for retrieving a content modification file associated with the requested Web content file, wherein the content modification file references the element in the Web content file, wherein the content modification file contains information about modifying the element so as to be displayable via the requesting pervasive computing device; and
   computer readable program code means for modifying the element using the information contained within the retrieved content modification file.

30. A computer program product according to claim 29 further comprising computer readable program code means for serving the requested Web content file with the modified element to the pervasive computing device for display thereon.

31. A computer program product according to claim 29 wherein the Web content file is a HyperText Markup Language (HTML) file.

32. A computer program product according to claim 29 wherein the computer readable program code means for retrieving a content modification file associated with the Web content file comprises:
   computer readable program code means for computing a hash value using content within the Web content file; and
   computer readable program code means for retrieving a content modification file associated with the computed hash value from a repository of content modification files.

33. A computer program product according to claim 29 wherein the computer readable program code means for modifying the element comprises computer readable program code means for replacing the element with an alternative element identified within the retrieved content modification file, wherein the alternative element is displayable via the pervasive computing device.

34. A computer program product according to claim 29 wherein the computer readable program code means for modifying the element comprises means for splitting the element into multiple elements.

35. A computer program product according to claim 29 wherein the computer readable program code means for modifying the element comprises computer readable program code means for modifying the element to conform with identified characteristics of the pervasive computing device.

36. A computer program product according to claim 29 wherein the Web content file comprises a plurality of elements, wherein each element has a respective priority value assigned thereto, and wherein the computer readable program code means for modifying an element comprises computer readable program code means for removing elements that have respective priority values that are below a selected threshold value.

37. A computer program product according to claim 29 wherein the Web content file comprises a plurality of elements, wherein each element has a respective priority value assigned thereto, and wherein the computer readable program code means for modifying an element comprises computer readable program code means for modifying elements that have respective priority values that are below a selected threshold value.

38. A computer program product according to claim 29 wherein the retrieved content modification file is an eXtensible Markup Language (XML) file.

39. A computer program product for modifying a HyperText Markup Language (HTML) file for display via a pervasive computing device, wherein the HTML file contains a plurality of elements each having respective characteristics that can hinder display thereof via the pervasive computing device, comprising:

computer readable program code means for analyzing the requested HTML file for a link to a content modification file, wherein the content modification file references the plurality of elements, and wherein the content modification file contains information about modifying the plurality of elements so as to render the elements displayable via the pervasive computing device;

computer readable program code means for retrieving the identified content modification file; and computer readable program code means for replacing at least one element with an alternative element identified in the retrieved content modification file, wherein the alternative element is displayable via the pervasive computing device.

40. A computer program product according to claim 39 wherein the plurality of elements have respective priority values assigned thereto, and further comprising computer readable program code means for removing elements that have respective priority values that are below a selected threshold value.

41. A computer program product according to claim 39 wherein the plurality of elements have respective priority values assigned thereto, and further comprising computer readable program code means for modifying elements that have respective priority values that are below a selected threshold value.

42. A computer program product according to claim 39 further comprising computer readable program code means for splitting at least one of the elements into multiple elements.

\* \* \* \* \*